(12) United States Patent
Jaffe

(10) Patent No.: US 11,033,988 B2
(45) Date of Patent: Jun. 15, 2021

(54) FABRICATION SQUARE

(71) Applicant: Eric Jaffe, Henrico, VA (US)

(72) Inventor: Eric Jaffe, Henrico, VA (US)

( * ) Notice: Subject to any disclaimer, the term of this patent is extended or adjusted under 35 U.S.C. 154(b) by 0 days.

(21) Appl. No.: 15/991,056

(22) Filed: May 29, 2018

(65) Prior Publication Data

US 2019/0366489 A1 Dec. 5, 2019

(51) Int. Cl.
*B23K 37/04* (2006.01)

(52) U.S. Cl.
CPC ...... *B23K 37/0443* (2013.01); *B23K 37/0452* (2013.01)

(58) Field of Classification Search
CPC . B23Q 3/005; B23Q 3/02; B23Q 3/06; B23Q 3/061; B25B 11/00; B25B 11/02; B25B 5/142; B23K 37/04; B23K 37/0408; B23K 37/0435; B23K 37/0443; A47B 47/00; A47B 47/0033; F16B 12/50; B27G 5/02; E04B 1/2608
See application file for complete search history.

(56) References Cited

U.S. PATENT DOCUMENTS

| 2,415,259 | A | * | 2/1947 | Renton | B25B 5/142 269/109 |
| 2,498,725 | A | | 2/1950 | Thornburg | |
| 5,240,216 | A | * | 8/1993 | Lin | E05D 15/38 16/94 R |
| 6,860,475 | B2 | | 3/2005 | Wong | |
| 7,591,076 | B2 | | 9/2009 | Varnedoe | |
| 2007/0241250 | A1 | | 10/2007 | Wong | |
| 2011/0303813 | A1 | * | 12/2011 | Lijesnic | A47B 47/0033 248/309.1 |

\* cited by examiner

*Primary Examiner* — Tyrone V Hall, Jr.
*Assistant Examiner* — Abbie E Quann

(57) ABSTRACT

Provided is a fabrication square for aligning workpieces. The square includes a triangular shaped base, a first arm, a second arm, and a relief cut where the arms intersect the base. The arms extend away from the base at a 90-degree angle. The base and first arm further include a series of holes that match the hole pattern found on a conventional metal fixture table, while the second arm includes a slot to allow for rotation. The square can be aligned with and attached to the fixture table with one or more fixture stops that secures the square to the table via the holes. The use of the square, fixture stops, and table lock the workpieces in position, which in turn prevents movement before, during, and after welding, thereby increasing fabrication precision.

10 Claims, 4 Drawing Sheets

FABRICATION SQUARE

BACKGROUND OF THE INVENTION

1. Field of the Invention

The present invention relates to a fabrication square. More particularly, it pertains to a fabrication square comprising a series of holes that match the hole pattern found on a conventional metal fixture table, wherein the holes enable the square to be aligned with and attached to the fixture table via one or more fixture stops for increasing precision during the welding and fabrication process.

In the construction/fabrication industry, angles play a critical role in determining the safety and precision of a device or structure. As can be appreciated, one of the most critical aspects in fabrication is to ensure that the correct angles are used. The improper measurement or use of angles can produce walls that are out of plumb, components that do not properly fit, and can lead to unsafe structures that may collapse, leave draughty gaps, or allow for the ingress of water.

In the field of metalworking, one of the most challenging parts of fabrication involves ensuring that workpieces are square both before and after welding. Even when properly aligned prior to welding, pieces tend to move and shift due to the application of heat. Movement may cause the components to twist or pull, leading to finished products that are not square, misaligned, or unusable.

Many tools are known and used to assist in the proper measuring and fabricating of angles. One of the most commonly used tools to assist with proper measuring of angles is a square. As can be appreciated, squares are used for making basic measurements, marking lines on workpieces, and marking 45 and 90-degree angles. While basic squares have been known and used for centuries, specialized squares for particular applications have continued to evolve and develop. One example is a speed square, which combines some of the most common functions of the combination square, try square, and framing square into a single device. Speed squares are used to make basic measurements, to mark lines on dimensional lumber, and as a saw guide for making 45 and 90-degree cuts.

While these devices assist with measuring and aligning workpieces, they are not, however, designed to hold workpieces together during the welding process. Traditional squares are used for ensuring that workpieces are aligned prior to cutting or fabrication, but they do not provide a means for securely holding pieces in place during fabrication. As discussed above, if workpieces are not properly held in position, the application of heat may cause misalignment. It is clear from the above description that a need exists for a square that can both align workpieces and secure them in position during the fabrication process.

2. Description of the Prior Art

Various devices have been proposed for securing a workpiece in position during the fabrication process. For example, U.S. Pat. No. 6,860,475 B2 discloses a square for use in fabrication. The device includes three base plates and a floating right-angle head mounted through a threaded shaft with a button for rapid advance and return. The device further includes a base plate extension with a clamping arm and a threaded shaft that is mounted to two of the base plates. The clamping arm can be swung away for easy removal of the workpiece. The outside walls of the base plates are flat and square so that the angle clamp can be laid sideways to hold a workpiece vertically in position.

U.S. Pat. No. 7,591,076 B2 discloses a universal squaring jig which may be used when welding various workpieces in perpendicular orientation. The squaring jig has two workpiece holders attached together by support members. Each holder has three mating surfaces, wherein the first and second mating surfaces together form a perpendicular interior corner.

U.S. Patent Application Publication No. 2007/0241250 A1 discloses an angle bracket with an elongated upper arm member formed adjacent to the top end of a connecting member and an elongated lower arm member connected to the bottom end of the connecting member. The rear surface of the respective arm members form a 90-degree angle with each other for securing workpieces during the fabrication process.

U.S. Pat. No. 2,415,259 A discloses adjustable mitered clamps adapted to hold work-pieces in a desired angular position while adjacent pieces are being secured to each other. The device can be used in conjunction with a mounting plate having a series of holes.

As can be seen from the above, several attempts have been made in the prior art to overcome the challenges inherent with using traditional squares to secure workpieces in position during the fabrication process. While the prior art devices assist a user in securing workpieces during fabrication, they are not adapted for use with a conventional metal fixture table. These prior art devices do not include a square with a series of holes that match the hole pattern found on a conventional metal fixture table, or a slot that enables rotation of the square while secured to the table. It is clear from the above that there are currently no devices that can be aligned with and attached to the fixture table via this hole pattern. In this regard, the present invention substantially fulfills this need.

SUMMARY OF THE INVENTION

The present invention overcomes the problems inherent with current fabrication squares by providing a new and improved square that can be used for aligning workpieces. The device comprises a triangular shaped base, a first arm, a second arm, and a relief cut where the arms intersect the base. The arms extend away from the base at a 90-degree angle. The base and first arm further include a series of holes that match the hole pattern found on a conventional metal fixture table, while the second arm includes a slot to allow for rotation. The holes are preferably 16 mm holes spaced two-inches apart on center. By matching the hole pattern, the square can be aligned with and attached to the fixture table. The square can be aligned with and attached to the fixture table with one or more fixture stops that secure the square to the table via the holes. Additionally, one fixture stop can be placed in the slot in the arm to allow for rotation of the device while it is secured to the table. The use of the square, fixture stops, and the table lock the workpieces in position, which in turn prevents movement before, during, and after welding, thereby increasing fabrication precision.

The present invention substantially diverges in design elements from the prior art and consequently it is clear that there is a need in the art for an improvement to existing fabrication squares. In this regard the instant invention substantially fulfills these needs.

OBJECTS OF THE INVENTION

In view of the foregoing disadvantages inherent in the known types of fabrication squares now present in the prior art, the present invention provides a new fabrication square device wherein the same can be utilized for increasing fabrication precision.

It is therefore an object of the present invention to provide a new and improved fabrication square that has all of the advantages of the prior art and none of the disadvantages.

It is another object of the present invention to provide a fabrication square that includes a series of holes that match the hole pattern found on a conventional metal fixture table Another object of the present invention is to provide a fabrication square that can be attached to a metal fixture table with the use of one or more fixture stops that fit within the hole in the square and the table.

Yet another object of the present invention is to provide a fabrication square that locks the workpiece in position to prevent movement before, during, and after fabrication.

A final object of the present invention is to provide a fabrication square having a slot in one of the arms to allow for rotation of the device on the fixture table.

The fabrication square may be readily fabricated from materials that permit relative economy and are commensurate with durability. Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 8A:
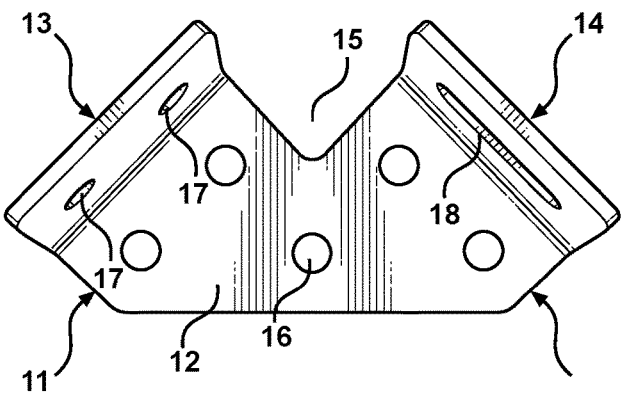

FIG. 8A. shows an overhead view of a first embodiment of the fabrication square.

Figure 8B:
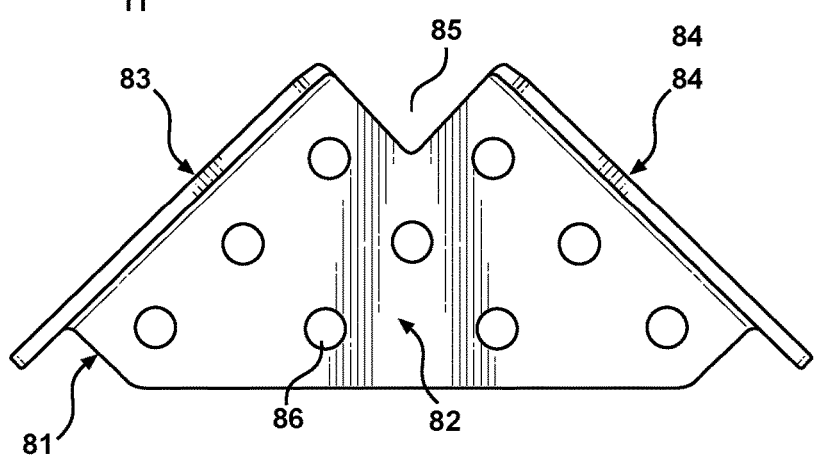

FIG. 8B. shows an overhead view of a second embodiment of the fabrication square.

DETAILED DESCRIPTION OF THE INVENTION

Reference is made herein to the attached drawings. Like reference numerals are used throughout the drawings to depict like or similar elements of the fabrication square. For the purposes of presenting a brief and clear description of the present invention, the preferred embodiment will be discussed as used for aligning and securing workpieces in position before, during, and after fabrication. The figures are intended for representative purposes only and should not be considered to be limiting in any respect.

Figure 1:
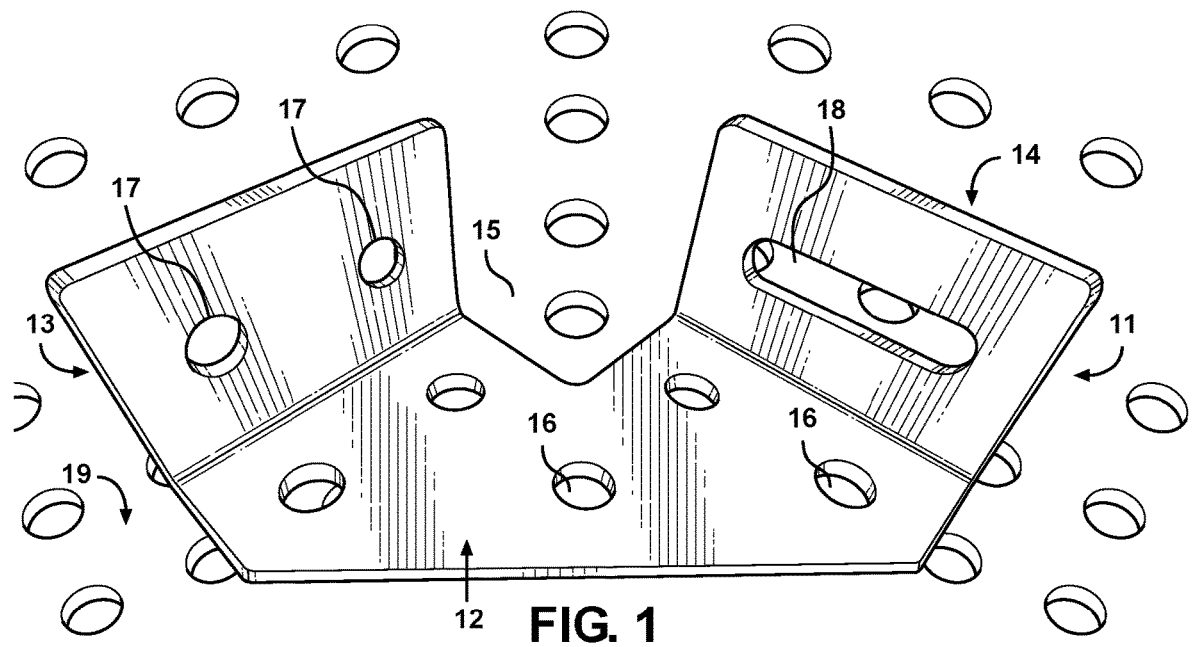
FIG. 1 shows a perspective view of the fabrication square.

Referring now to FIG. 1, there is shown a perspective view of the fabrication square 11. The device comprises a triangular shaped base 12, a first arm 13, a second arm 14, and a relief cut 15 where the first arm 13 and second arm 14 intersect. The first and second arms 13, 14 extend away from the base 12 at a 90-degree angle. The base 12 further includes a first plurality of holes or apertures 16 that match the aperture pattern on a metal fixture table 19. Additionally, the first arm 13 includes a second plurality of apertures 17, while the second arm 14 includes a slot 18. As with the first plurality apertures 16 on the base 12, the second plurality of apertures 17 and slot 18 match the metal fixture table 19 aperture pattern.

In the preferred embodiment, the first and second apertures 16, 17, comprise a plurality of 16 mm holes spaced two inches apart on center. As can be appreciated, this 16 mm two-inch spacing pattern mimics the aperture spacing pattern found on a conventional metal fixture table 19 that is well understood and readily available in the art. By matching the aperture pattern, the square 11 can be utilized with a fixture table 19 and can be attached thereto with one or more fixture stops, which will be shown in further detail below. The slot 18 in the second arm 14 preferably maintains the 16 mm pattern and thereby retains the same function as the round holes, while allowing for rotation of the square 11 when secured to the table 19.

Figure 2:
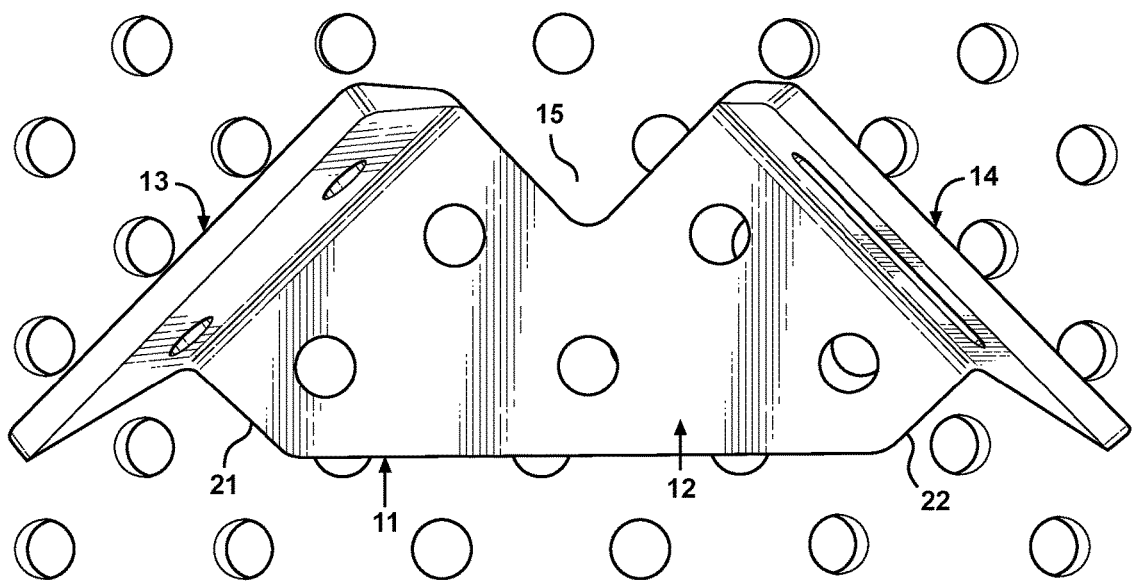
FIG. 2 shows an overhead view of the fabrication square.

Referring now to FIG. 2, there is shown an overhead view of the fabrication square 11. The base 12 includes a relief cut 15 where the first arm 13 and second arm 14 intersect. The relief cut 15 serves as a V-shaped notch that prevents the first and second arms 13, 14 from intersecting. The primary function of the relief cut 15, however, is to provide space for the joining of two pieces of material. The relief cut 15 provides working space and access in order to position, align, and weld material that joins and intersects at this location. The points opposite of the relief cut 15 further include a first and second notch 21, 22 that enable the square 11 to be positioned such that one of the arms is at a 90-degree angle to the table, while the other arm is perpendicular to the table. This notch 21, 22 configuration provides additional positions for securing and welding that would not be otherwise possible if the base 12 and arms 13, 14 met at a point.

Figure 3:
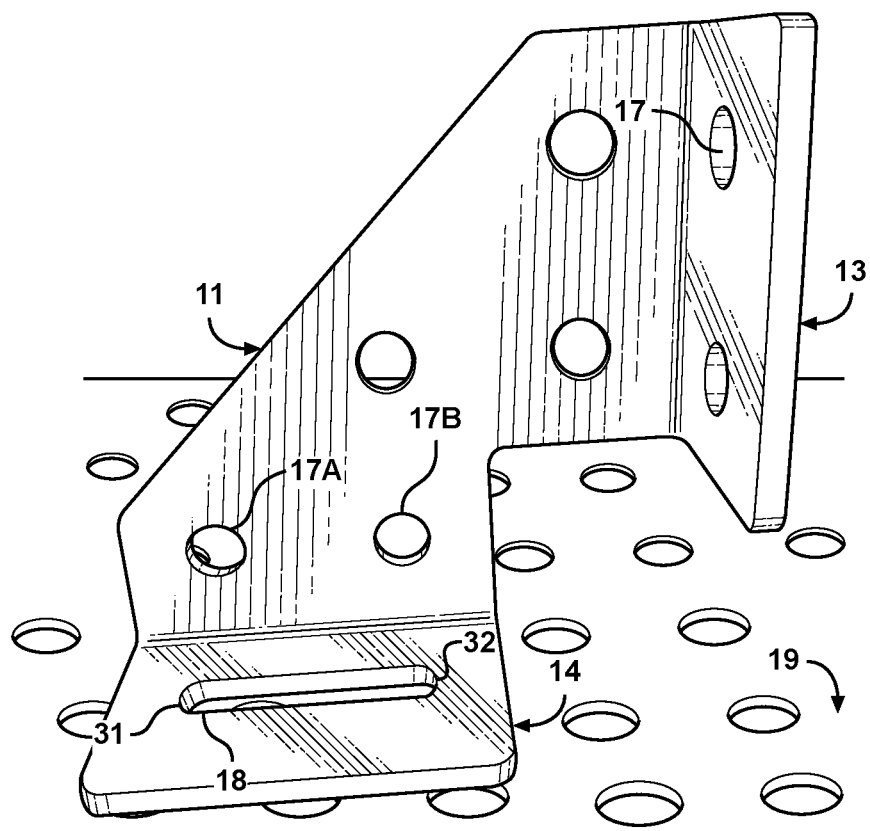
FIG. 3 shows a perspective view of the fabrication square with the second arm and slot making contact with a fixture table.

Referring now to FIG. 3, there is shown a perspective view of the fabrication square 11 with the second arm 14 and slot 18 making contact with a fixture table 19. The first and second arms 13, 14 extend away from the base 12 at a 90-degree angle. Additionally, the first and second arms 13, 14 are configured at a 90-degree angle to one another. As can be appreciated, the angle enables workpieces to be secured to either arm 13, 14 at a 90-degree angle for alignment, securing, and/or welding.

As shown in FIG. 3, the square 11 comprises a first arm 13 having a pair of apertures 17, and a second arm 14 with a slot 18. The distal portions 31, 32 of the slot 18 are the same dimension and in the same configuration as the distal portions of the apertures 17A, 17B. This configuration enables use of the slot 18 in the same manner as the apertures 17, while additionally providing a user with the capability of rotating the square 11 as needed. In a first embodiment, the square can include a slot in each arm. In a second embodiment, the square can include a pair of apertures in each arm. In a third embodiment, the square can include solid arms without any slots or apertures.

Figure 4:
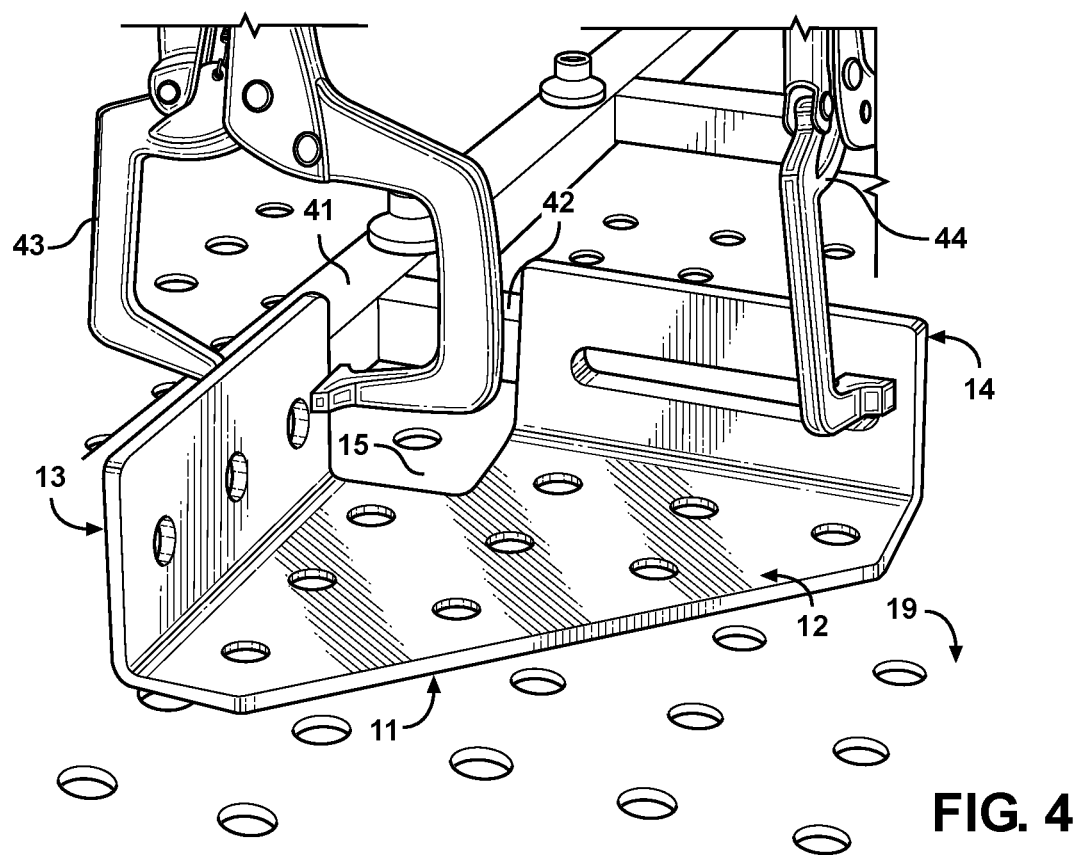
FIG. 4 shows a perspective view of the fabrication square in use securing workpieces in position for fabrication.

Referring now to FIG. 4, there is shown a perspective view of the fabrication square 11 in use securing workpieces 41, 42 in position for fabrication. In this example, the device is securing workpieces 41, 42 at a 90-degree angle for fabrication. The base 12 is positioned against the fixture table 19, while a first workpiece 41 is secured in position to the first arm 13 and a second workpiece 42 is secured in position to the second arm 14. As shown, the workpieces 41, 42 are held in position via clamps 43, 44, however any tool that provides a means for securing the workpiece to the square 11 can be utilized. As discussed above, the first and second arms 13, 14 extend away from the base 12 at a 90-degree angle and are configured at a 90-degree angle to one another. These angles ensure that the workpieces 41, 42 attached to the arms 13, 14 will meet at a 90-degree angle.

Also evident in this example is the working space afforded by the relief cut 15. Workpiece 41 intersects workpiece 42 at a 90-degree angle. The relief cut 15 provides space at this intersection for adjustments and for welding the materials together. The relief cut 15 also enables the square 11 to remain in position before, during, and after welding. As can be appreciated, the square 11 enables a user to align the workpieces 41, 42 at the desired angle, secures them in position during fabrication, and holds the workpieces 41, 42 in position after fabrication to prevent movement that commonly occurs from the application of heat.

Figure 5:
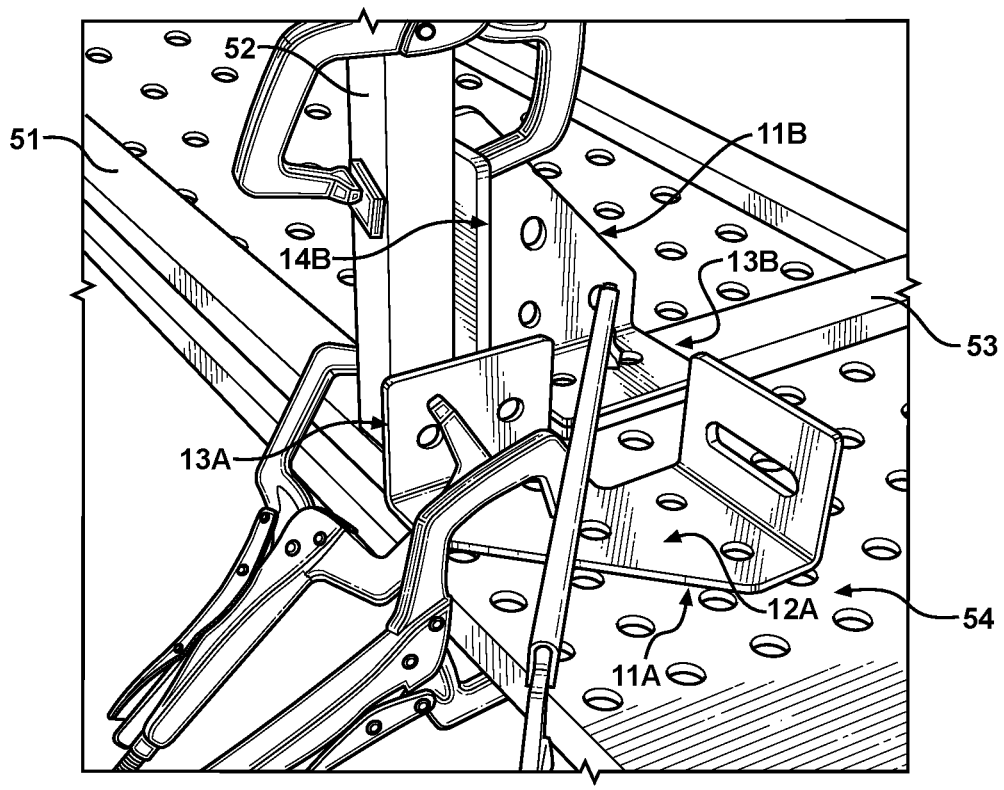
FIG. 5 shows a close-up view of two fabrication squares in use securing multiple workpieces in position for fabrication.

Referring now to FIG. 5, there is shown a close-up view of two fabrication squares 11A, 11B in use securing multiple workpieces 51-53 in position for fabrication. In this example, two squares 11A, 11B are used to align and secure multiple workpieces 51-53 in position. Workpiece 52 extends vertically from workpiece 51 and 53. As can be appreciated, workpiece 52 must be aligned and welded at a 90-degree angle with respect to both workpiece 51 and workpiece 53. To accomplish this, square 11A ensures proper alignment between workpiece 51 and 52, while square 11B ensures proper alignment between workpiece 52 and 53. Proper alignment is made possible by the first arm 13A, which extends away from the base 12A at a 90-degree angle. As show, the square 11A is clamped to the table 54, causing the first arm 13A to extend above the table 54 at 90-degrees. Securing workpiece 52 to the first arm 13A aligns workpiece 52 at a 90-degree angle with relation to workpiece 51, which is clamped to the table 54. Similarly, square 11B secures workpiece 52 at a 90-degree angle with relation to workpiece 53 by securing second arm 14B to workpiece 52, while the first arm 13B is aligned with workpiece 53, which is also clamped to the table 54.

Figure 6:
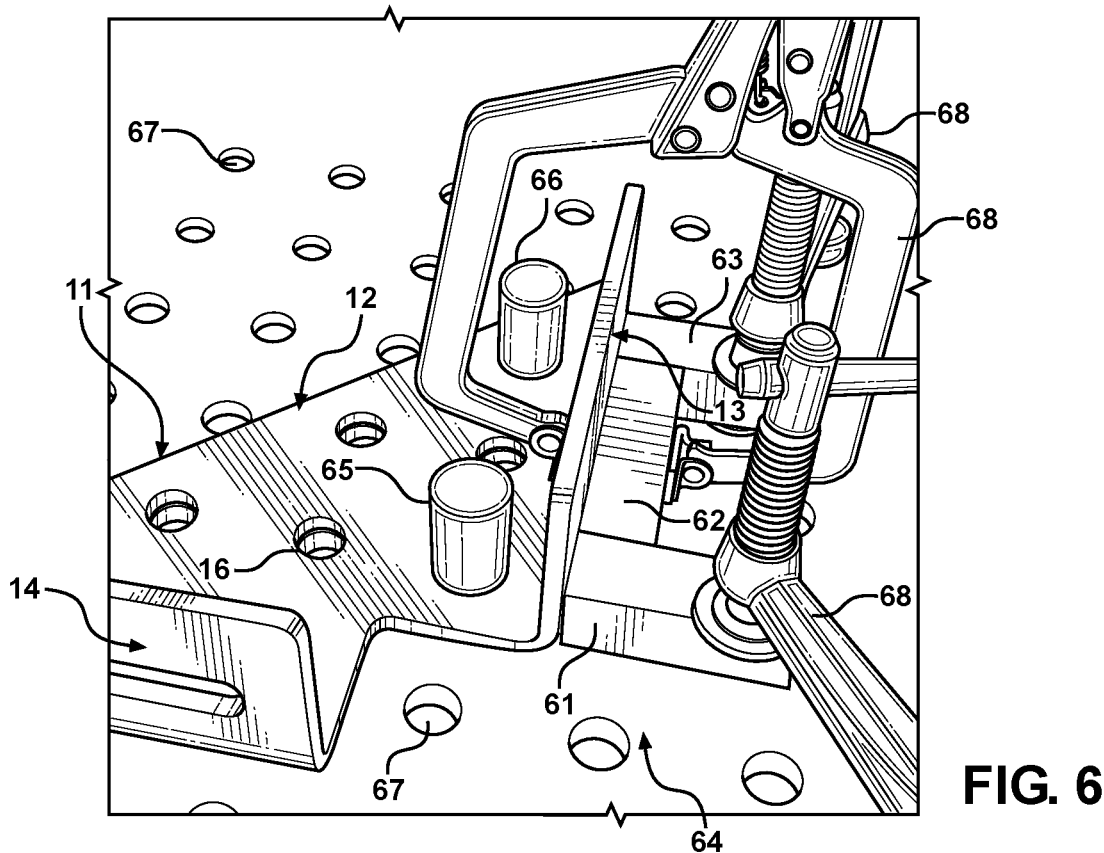
FIG. 6 shows a perspective view of the fabrication square in use securing workpieces in position on a fabrication table with the use of two fixture stops.

Referring now to FIG. 6, there is shown a perspective view of the fabrication square 11 in use securing workpieces 61-63 in position on a fabrication table 64 with the use of two fixture stops 65-66. One of the key features of the square 11 is its ability to be locked in position on a fabrication table 64 with the use of the apertures 16 and one or more fixture stops 65, 66. As discussed above, a fabrication table 64 comprises a plurality of apertures 67 comprising 16 mm holes spaced two inches apart on center. These table apertures 67 are designed for attaching various accessories to the table 64 to aid in fabrication. The square 11 of the present invention takes advantage of this pattern by copying it into the base 12 and arms 13, 14 of the square 11. As shown in FIG. 6, one or more fixture stops 65, 66 can be inserted through the aperture 16 of the square 11 and into the aperture 67 in the table 64. The fixture stops 65, 66 create a secure connection between the square 11 and table 64 and make it virtually impossible for movement therebetween to occur.

When the square 11 is secured to the table 64 via the fixture stops 65, 66, a variety of fabrication techniques are possible to increase welding precision. As one non-limiting example, the square 11 can be affixed to the table 64 in a manner that causes the side arm 13 to function as a wall for aligning workpieces 61-63 for welding. As shown, workpieces 61-63 are aligned against the side arm 13 and are held in position with a variety of clamping devices 68. Pressure can then be applied by squeezing the workpieces 61-63 towards the side arm 13 until there is no space therebetween. The fixture stops 65, 66 prevent any movement of the square 11, which in turn prevents movement of the workpieces 61-63 once they are clamped into position. In this configuration, the square 11 functions as an immovable extension of the table 64 and is held in position far more securely than a conventional square that requires the use of a clamp for stabilization.

Figure 7A:
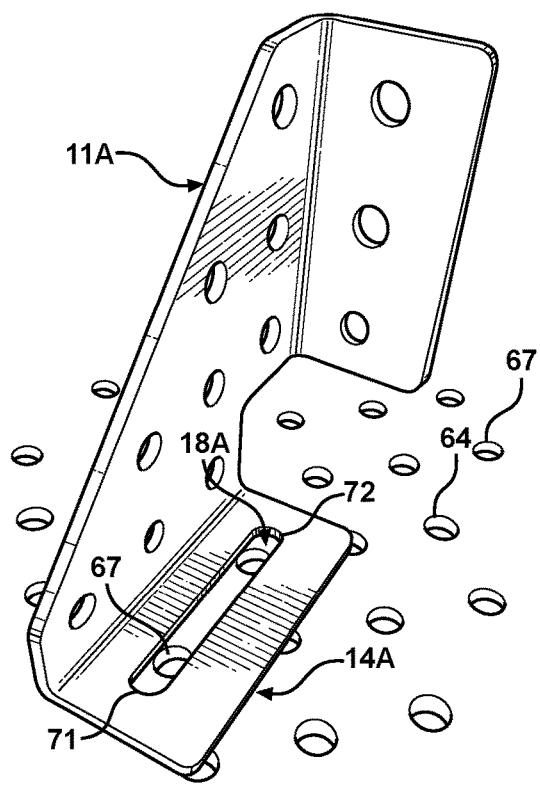
FIG. 7A shows a view of the fabrication square with the second arm and slot positioned over the apertures in a fabrication table.
Figure 7B:
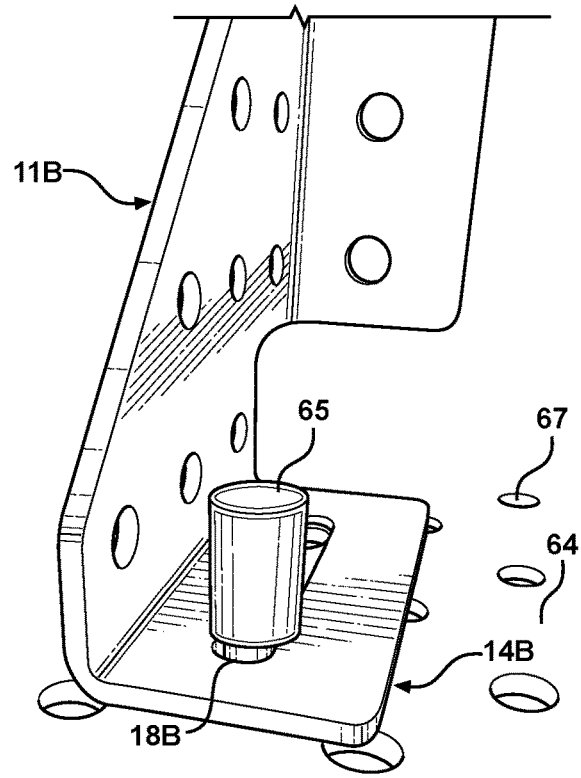
FIG. 7B shows a view of the fabrication square with the second arm and slot secured via a fixture stop to the fabrication table.

Referring now to FIGS. 7A and 7B, there is shown a view of the fabrication square 11A with the second arm 14A and slot 18A positioned over the apertures 67 in a fabrication table 64, and a square 11B with the second arm 14B and slot 18B secured via a fixture stop 65 to the fabrication table 64. As shown, the second arm 14A of the square 11 includes a slot 18A in place of spaced holes. The slot 18B can be positioned over the table apertures 67 and can be affixed thereto via a fixture stop 65. The slot 18B allows the square 11B to rotate about the surface of the fixture table 64. As can be appreciated, if one fixture stop 65 is used, the square 11B can slide back and forth until the ends of the slot make contact with the fixture stop 65. In addition to sliding back and forth, the square 11B can rotate about the fixture stop 65 a full 360-degrees for enhanced adjustability. If two fixture stops are used as shown in FIG. 5, the square is locked in position on the table. Due to the added space in the slot 18B, the square 11B can even be locked in position with multiple fixture apertures 67 that have different spacing, such as apertures 67 that are diagonal to each other.

In a first embodiment, the distal ends 71, 72 of the slot 18A maintain the 16 mm pattern and thereby allows the slot 18A to retain the same function as the round holes, while also allowing for rotation of the square 11A when secured to the table 64. In a second embodiment, the distal ends 71, 72 of the slot 18A can be longer than the conventional two inches apart on center. The additional length of the slot 18A enables the device to be locked in position with apertures 67 that are further apart.

As described above, the square can include 1) apertures in the first arm and a slot in the second arm, 2) a slot in the first arm and apertures in the second arm, 3) a slot in each arm, 4) apertures in each arm, or (5) solid arms without any slots or apertures.

Referring now to FIGS. 8A and 8B, there are shown overhead views of multiple embodiments of the fabrication square 11, 81. The square 11 of the present invention can be constructed in any desired size. In a first embodiment, the square 11 is constructed in a six-inch version, with three primary apertures 16 across the length of the base 12, two secondary apertures 17 across the width of the first arm 13, and a slot 18 that spans the width of two apertures in the second arm 14. In a second embodiment, the square 81 is constructed in a eight-inch version, with four primary apertures 86 across the length of the base 82, three secondary apertures (not shown) across the width of the first arm 83, and a slot (not shown) that spans the width of two apertures in the second arm 84. As shown, the relief cuts 15, 85 are the same dimension for providing access to material when fabricating. The relief cuts 15, 85, however, can be increased or decreased in size as desired. The size and number of apertures and slots as shown and described are for illustrative purposes only, and are not intended to limit the scope of the invention. Squares of varying size, shape, dimension, and with varying aperture/slot configuration also fall within the scope of the present invention. Additionally, the present invention can be readily fabricated from steel, aluminum, any other desired metal, plastic, or any other suitable material.

Overall, the present invention provides a convenient solution for aligning workpieces for fabrication. The square allows for precise alignment of workpieces, provides access to workpiece joints for welding, and readily secures to the metal fixture table. The present invention can be used with one or more fixture stops and a fixture table to secure workpieces in position. The combination of the square, stops, and table prevent movement before, during, and after welding, thereby increasing fabrication precision.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system comprising a fabrication square and a metal fixture table, said metal fixture table comprising an aperture pattern, said fabrication square comprising:
    a triangular shaped base, a first arm, a second arm, and a relief cut where said first arm and said second arm intersect said base;
    said first arm and said second arm extending away from said base at a 90-degree angle;
    said base further comprising a first plurality of apertures that correspond to said aperture pattern on said metal fixture table;
        said base further comprising a first notch opposite said relief cut, and
        a second notch opposite said relief cut,
    said first arm further comprising a second plurality of apertures that correspond to said aperture pattern on said metal fixture table;
    said second arm further comprising a slot that corresponds to said aperture pattern on said metal fixture table, said slot spanning a width of at least two of said first plurality of apertures of said base;
    said first plurality of apertures, said second plurality of apertures, and said slot of said square securing said square to said metal fixture table.

2. The system of claim 1, wherein said first plurality of apertures, said second plurality of apertures, and said slot of said square secure said square to said fabrication table via one or more fixture stops.

3. The system of claim 2, wherein said slot enables said square to rotate around said fixture stop when said square is secured to said table by said fixture stop.

4. The system of claim 1, wherein said relief cut comprises an overall V-shaped notch defined by the V that prevents said first and second arms from intersecting.

5. The system of claim 4, wherein said relief cut provides space for the joining of two pieces of material when said material abuts said first and second arms.

6. The system of claim 1, wherein the distal ends of said slot are the same dimension and in the same configuration as distal ends of two corresponding apertures on said table.

7. The system of claim 1, wherein the distal ends of said slot are longer than distal ends of two corresponding apertures on said table.

8. The system of claim 1, wherein said square comprises a slot in said first-arm.

9. The system of claim 1, wherein said square comprises a pair of apertures in said first arm and a pair of apertures in said second arm.

10. The system of claim 1, wherein said second plurality of apertures comprises three apertures in said first arm, wherein the combined length of said three apertures is the same length as the slot in said second arm.

* * * * *